Sept. 22, 1970  J. GORMLEY ET AL  3,530,389
ELECTRONIC PROCESS CONTROLLER HAVING A TWO PART ERROR AMPLIFIER
Filed Feb. 9, 1968  3 Sheets-Sheet 1
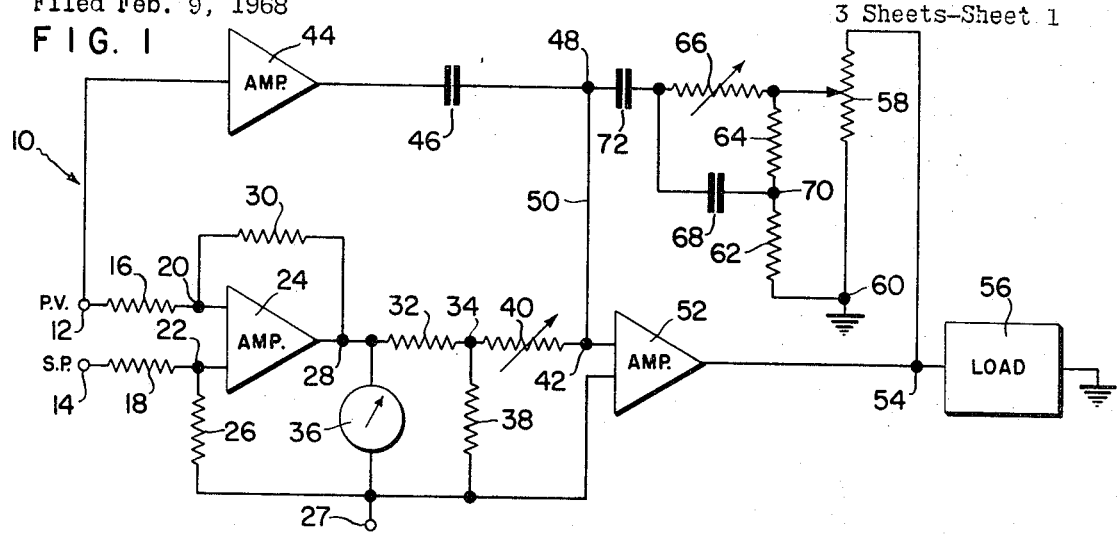
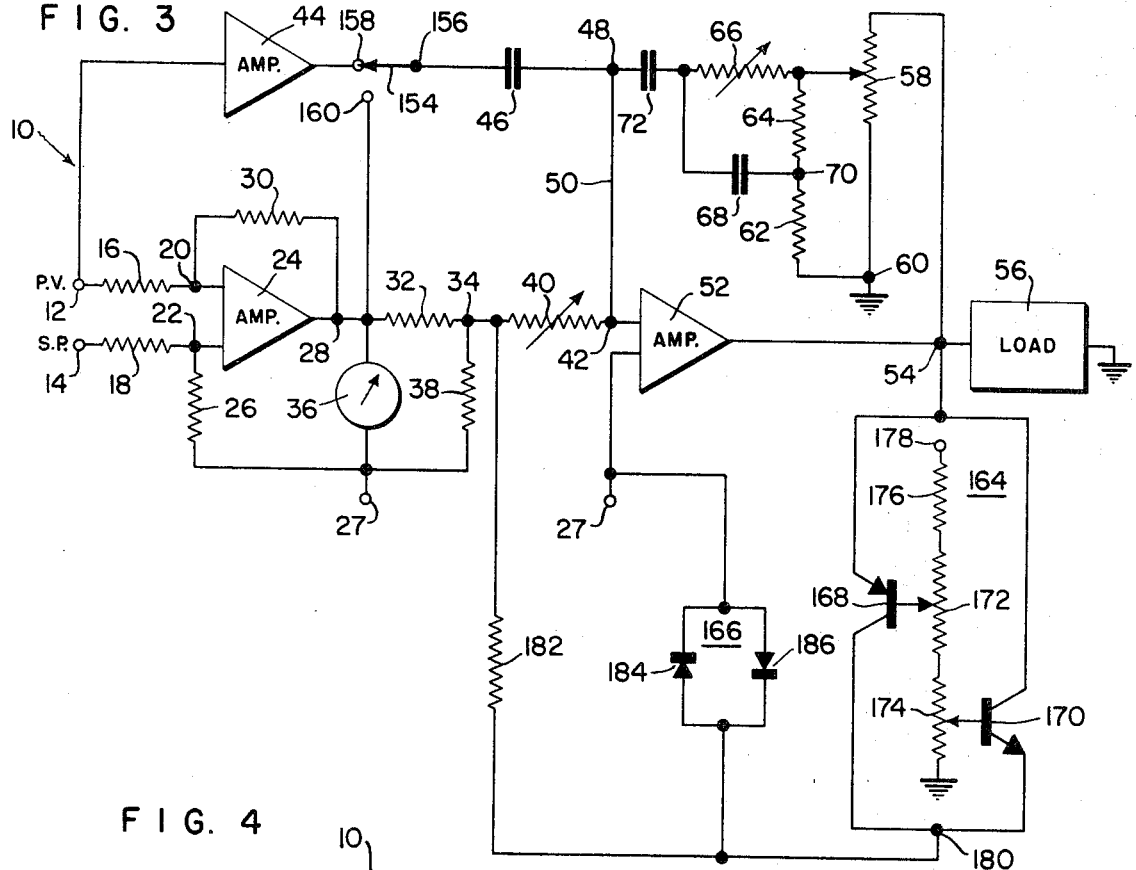
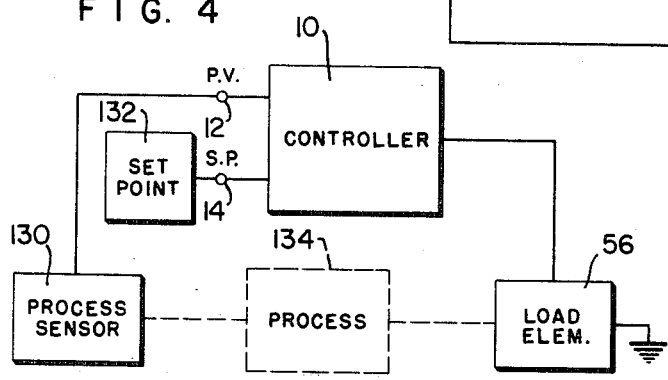
INVENTORS.
JOSEPH GORMLEY
JAMES A. HOGAN
BY
ATTORNEY.

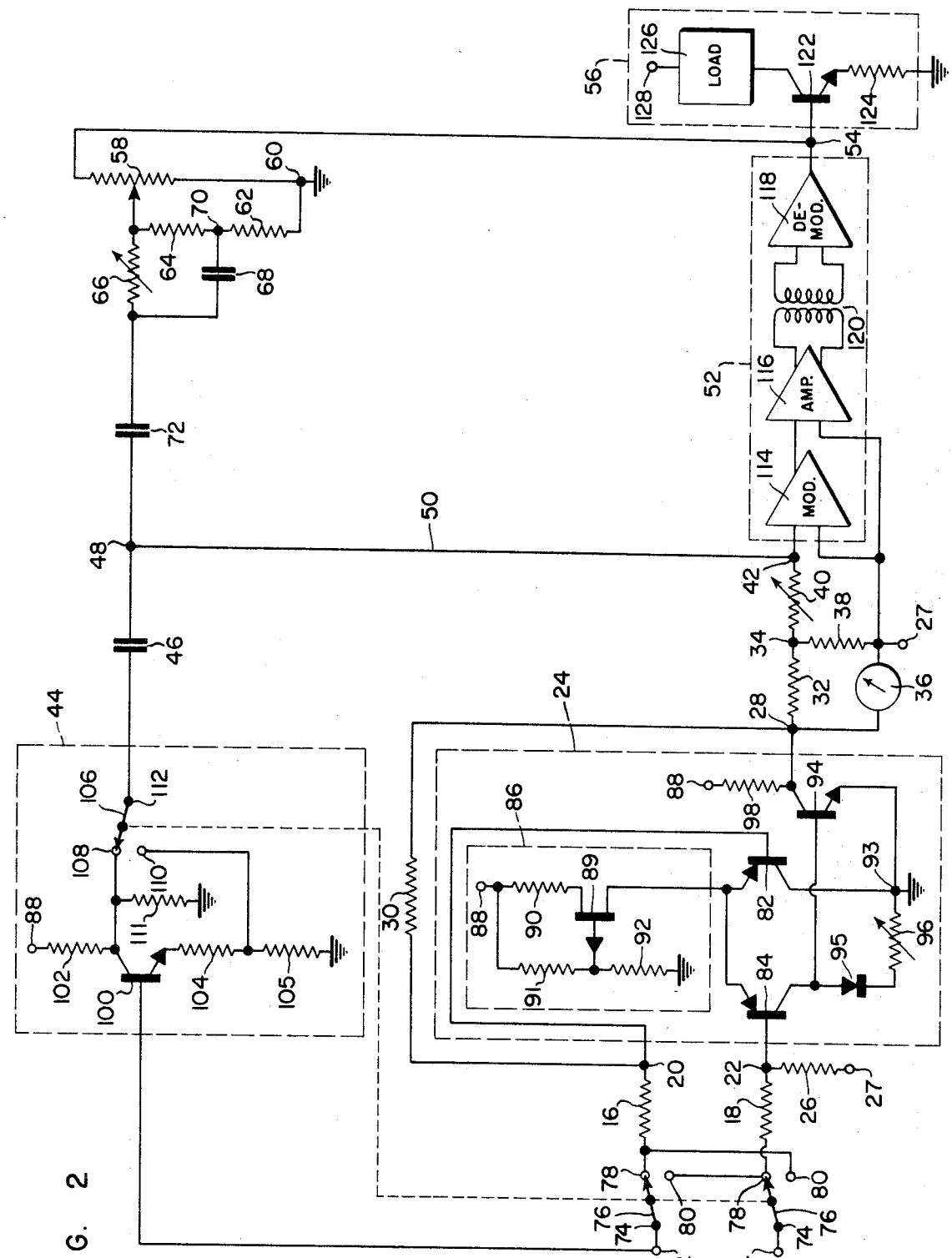

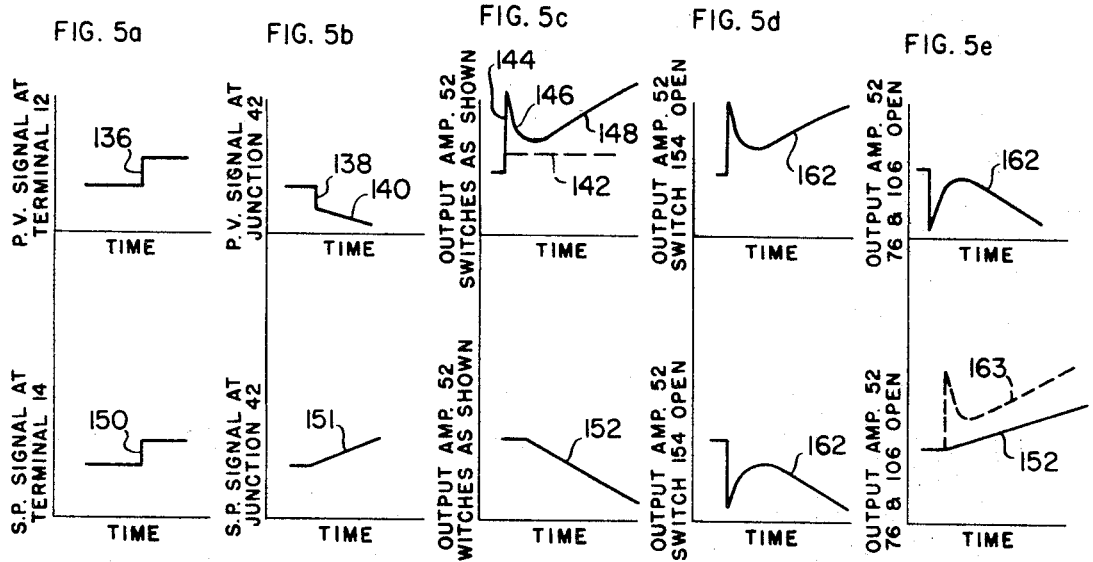
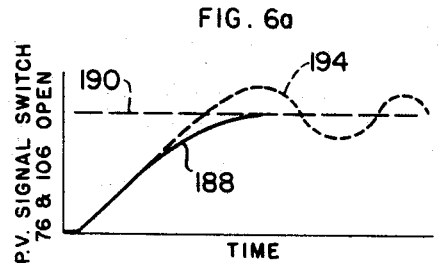
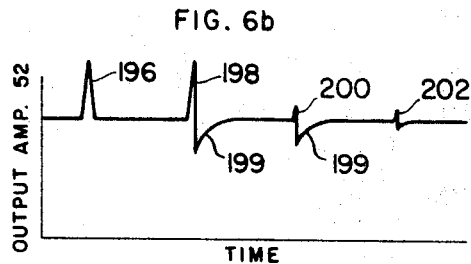

United States Patent Office 3,530,389
Patented Sept. 22, 1970

3,530,389
ELECTRONIC PROCESS CONTROLLER HAVING A TWO PART ERROR AMPLIFIER
Joseph Gormley, Southampton, and James A. Hogan, Hatfield, Pa., assignors to Honeywell, Inc., Minneapolis, Minn., a corporation of Delaware
Filed Feb. 9, 1968, Ser. No. 704,421
Int. Cl. H03f 1/02; G06f 11/00
U.S. Cl. 330—9
8 Claims

ABSTRACT OF THE DISCLOSURE

Circuitry operating from a single voltage power supply having an error amplifier and a controller amplifier is arranged to modify a process variable signal and a set point signal and produce an output signal which is applied to a load element for controlling a process. The error amplifier applies the process variable signal and the difference between the process variable signal and the set point signal to the controller amplifier. The controller amplifier modifies these signals to limit the output signal and prevent amplified saturation, reset wind up, transient disturbances and reset dumping.

The present invention relates to electronic process controllers; and, more particularly, to a three mode electronic process controller for controlling a process by providing a characterized output signal including the functions of proportional control, integral control, and derivative control. The characterized output signal is applied to a load element when the process being controlled undergoes a variation, while an output signal characterized only by the integral control is applied to the load element when the process set point is adjusted. The process controller of the present invention also limits the output signal generated thereby and prevents the accumulation of unwanted signals generated during integral control. Further, the process controller operates from a single polarity power supply wherein the input signals are of identical polarity. The process controller is arranged for preventing a transient signal from disturbing the load element or the integral control.

The process controller of the present invention is a novel apparatus which receives a signal from a sensor monitoring a process, compares that signal against a received set point signal for establishing an error signal, and provides a characterized output signal for controlling a load element and, in turn, the process. The signal from the automatic sensor, referred to herein as a process variable signal, may represent various process components as for example; pressure, flow rate, temperature, thickness, or any other physical, electrical, or chemical condition. The process variable and set point signals are utilized by the process controller for providing an output signal which automatically adjusts a load element, such as a pump or valve, for returning the monitored process variable to its desired set point. The prior art three mode process controllers utilize three functions for characterizing the output signal and maintaining the process at its set point. The first function is proportional control, or proportional band, which may be considered as a function of the ratio of full-scale swing of the output signal, and in turn the load element, to the deviation of the process variable signal from the set point signal. It should be noted that in prior art controllers the deviation of the process variable signal from the set point signal, or error signal, is the only signal applied to the controller amplifier of the electronic process controllers. However, in the present invention, both the process variable signal and the deviation, or error signal, are applied to the input of the controller amplifier.

In single mode controllers, utilizing only the proportional band function, the error signal is never fully eliminated as it is virtually impossible to reduce to zero the deviation between the process variable signal and the set point signal. This error condition is called "droop" and may be reduced to some extent through the use of a high gain amplifier. In many single mode controllers however, the high gain amplifier produces instability; and, therefore, integral control, or reset action, is introduced to minimize the amount of droop and allow the use of an amplifier having a higher gain than otherwise possible. The integral control operates after proportional control for establishing a characterized output signal which slowly returns the load element to the desired set point position. The integral control, or reset action, may be considered as a characterization of the output signal in accordance with the time integral of the error signal. The greater the deviation of the process variable from the set point, the greater will be the speed by which the reset action proportionally adjusts the final control element for returning the process variable to its set point.

In a situation where the deviation of the process variable from its set point is a rapid one, the utilization of the proporational band and reset action alone will not produce an output signal which is sufficient enough to rapidly adjust the load element. To overcome this problem a third function, derivative control or rate action, is introduced into the control circuitry of the process controller. The rate action may be considered as a means for producing an output signal which is a function of the rate of change of the error signal. It compares the rate at which the process variable changes from its set point and momentarily delays the passage of a feedback signal to the controller amplifier for permitting the controller to produce a characterized output signal of proportional magnitude to the rate of change to rapidly shift in the position of the load element.

In many prior art process controllers, it is necessary to place a process on line by manually adjusting the process to the desired set point before allowing the process controller to take over the automatic control thereof. For example, if the process is a holding furnace for melting ore into a molten metal, the process variable reflects the temperature of the ore while the set point becomes the desired holding temperature of the molten metal. As the process is placed on line and the ore brought up to the desired set point temperature, an error signal will be generated for a substantial length of time until the process variable and set point signals become equal. During this period, the deviation between the process variable and set point signal is generally large enough to cause the controller amplifier to saturate. This causes the process controller to produce and accumulate an increasingly large reset signal within its integral control or reset circuitry. Thus, when the process variable, in this example temperature, becomes equal to the set point, the saturated amplifier will not respond to the equality until after the accumulated reset signal has been dissipated. Once the accumulated reset signal has been dissipated, the amplifier will come out of saturation and take over the control of the process. Until this happens, however, the load element which in this example may be a fuel valve remains open. This causes the process variable to overshoot the set point and continue to increase until the process controller dissipates the reset signal, comes out of saturation, and begins to close the fuel valve for decreasing the temperature of the molten metal. The overshoot caused by the integral or reset action circuitry has been termed "reset windup." In some processes, the lag caused by the reset windup can be long enough to cause the furnace to overheat and destroy itself. In less extreme situations the molten ore could be heated to an excess temperature, thus causing undesirable crystalline formations therein. A less serious feature of this arrangement is the unnecessary waste of time and fuel in bringing the process up to temperature. As indicated above, this problem can be avoided by an operator manually adjusting the process until it has reached its set point and then switching the process controller into automatic operation.

Obviously, these disadvantages should be eliminated and many prior art process controllers have suggested means to do so. However, the circuitry suggested by these prior art controllers introduces other problems, such as the dumping of the reset signal. It is therefore a general object of the present invention to provide an improved electronic process controller for automatically bringing the process to its set point condition without requiring manual manipulation and including circuitry for improved automatic control once the process reaches its desired set point.

In the example of an ore melting furnace, after the ore has been brought up to temperature and a new quantity of ore added to the furnace, the temperature or process variable will decrease in value thus causing the process controller to produce a characterized output signal dependent upon the length of time the process variable remains below the set point and the rate at which the process variable drops below the set point. However, in the same process if it becomes necessary to adjust the set point, it may be undesirable to have the controller produce such a characterized output. This situation could occur when the consistency of the newly added ore, once brought up to temperature, differs from previous batches. Under these conditions, the readjustment of the set point should cause the process controller to gradually bring the process to its new temperature and it would be undesirable for the controller to produce a characterized output signal including the functions of proportional control, integral control, and deviative control. In this situation, the process controller should simply increase the temperature to the newly established set point under the influence of integral control. In prior art controllers, an operator would simply adjust the set point manually. An experienced operator would instinctively know, through past experience, that a quick turn of the set point control would cause the process to undergo undesirable and in some cases violent fluctuations. He would also know that a slow and even adjustment would bring the process to its new set point smoothly, thus avoiding problems of fluctuation. In the present day facilities, however, computers are utilized in place of the experienced operator. A computer changes the set point signal by a digital or analog input which may shift the level of the set point signal to its new value within milliseconds. This rapid shift, like the inexperienced operator, causes unwanted fluctuations within a process by activating the proportional control and derivative control circuits of the controller. Thus, if the present day electronic process controller is to be used in combination with a computer, it must be capable of automatically bringing a process up to a new set point level without causing reset windup; and it must be able to receive rapidly changing set point signals without creating fluctuations within the process.

Therefore, a second object of the present invention is to provide a process controller capable of producing a characterized output signal including proportional control, integral control, and derivative control upon deviation of the process variable signal while being further capable of producing a gradually changing output signal limited to integral control upon variation of the set point signal.

Another object of the invention herein presented is to provide a process controller which prevents reset windup and limits the magnitude of the output signal, prevents the controller amplifier from becoming saturated, and further prevents transient disturbances from affecting the integral control or reset action circuitry.

Yet another object of the present invention is to provide an electronic process controller with an error amplifying arrangement that allows the process controller to receive a process variable signal and a set point signal each having an identical polarity, wherein the controller is further arranged for allowing the characterized output signal produced thereby to respond directly to said input signals or to be reversed with respect thereto by the actuation of a single switch.

A further object of this invention is to provide a three mode, all transistorized, electronic process controller having a unique arrangement which allows the controller to maintain accurate control over a process through selected circuit combinations which may be easily manipulated to vary the characteristics of the controller output signal.

In accomplishing these and other objects, there has been provided, in accordance with the present invention, an electronic process controller having an error amplifier for receiving the process variable and set point signals. The error amplifier compares these signals and applies them, through input impedance elements, to the input of the controller amplifier. The controller amplifier is a high gain, high impedance operational amplifier having a feedback network connected to the input impedance elements. The output signal from the controller amplifier is thus characterized by the input impedance elements and the feedback network for application to a load element which controls the monitored process.

Other objects and many of the attendant advantages of the present invention will become readily apparent to those skilled in the art, as a better understanding thereof is obtained by reference to the following detailed description, when considered in connection with the accompanying drawings, wherein:

FIG. 1 is a schematic diagram representing an electronic process controller embodying the present invention;

FIG. 2 is a schematic diagram illustrating the electronic process controller and the error amplifying network thereof in greater detail;

FIG. 3 is a schematic diagram representing an electronic process controller and including reset and output limiting circuitry embodied within the present invention;

FIG. 4 is a block diagram showing a typical control loop utilizing an electronic process controller of the present invention;

FIGS. 5a and 5b are plots of the input signals;

FIGS. 5c, 5d and 5e are plots of various characterized output signals of the electronic process controller; and FIG. 6a is a graphic representation of the process variable signal, while FIG. 6b is the output of the process controller or the displacement of the load element under various input signal conditions.

Referring now to the drawings, FIG. 1 shows the electronic process controller generally at 10 having a pair of input terminals 12 and 14 which connect through input resistors 16 and 18, respectively, to input terminals 20 and 22 of a differential summing amplifier 24. The input terminal 22 of the differential summing amplifier 24 is connected through a biasing resistor 26 to a point of fixed potential 27. The output of the differential summing amplifier 24 is attached to an output terminal 28 which connects through a feedback resistor 30 to the input terminal 20 thereof. The output terminal 28 also connects through a resistor 32 to a first summing junction 34 and to a first terminal of a deviation meter 36 having a second terminal connected to the point of fixed potential 27. The first summing junction 34 connects through a biasing resistor 38 to the point of fixed potential 27 and through an adjustable reset resistor 40 to a second summing junction 42.

In the present invention, the input terminal 12 receives a process variable signal from a process sensor which represents a measured feature of the controlled process. This signal may vary within any given range; however, in the present invention, the process variable signal varies between 1 and 5 volts. The set point signal, received by input terminal 14, determines the level to which the process is controlled and may be provided by any suitable means, such as an adjustable source of reference potential. In the present invention the set point signal also varies between 1 and 5 volts. The process variable signal and set point signal are applied through input resistors 16 and 18, respectively, to the input terminals 20 and 22 of the differential summing amplifier. When the process variable and set point signal are equal, the output of the differential amplifier 24 is equal to the value of the point of fixed potential 27. In the present invention, the value of the fixed potential 27 may be 3 volts. This value has been chosen as it provides a convenient center for a full scale of 1 to 5 volts. In this arrangement the maximum deviation from the midscale setting will be 2 volts. Thus, the charge on the system memory capacitors, not shown, will never exceed 2 volts thereby minimizing the drift of their memory capacitors. When the process variable and set point signals become unequal, for example the process variable increases, the differential summing amplifier 24 produces an output which is applied to the first summing junction 34 and also the second summing junction 42 through the reset resistor 40. The increased process variable signal is also applied through a single stage process variable amplifier 44 to the first electrode of an input capacitor 46. The second electrode of the capacitor 46 is connected to a node 48 which is retained as the same potential as the second summing junction 42 by a common connection 50. Due to this arrangement, a change in the process variable signal is applied directly through the capacitor 46 to the second summing junction 42 and also through the differential summing amplifier 24 thereto.

The second summing junction 42 is connected to the input of a high gain, high impedance controller amplifier 52 having an output terminal 54. Impedance means are provided between the output terminal 54 of the high impedance amplifier 52 and the input thereof, as represented by the junction 42, for forming a feedback network. In this manner the high impedance amplifier 52 is connected in an operational amplifier configuration and the second summing junction 42 becomes a current summing junction. The output terminal 54 of the high impedance amplifier 52 is also connected to a load element 56 which in turn connects to a point of fixed potential, such as ground.

The impedance means within the feedback network of the high impedance controller amplifier 52 includes an adjustable proportional band potentiometer 58 having one terminal of its slidwire connected to the output terminal 54 and the second terminal thereof connected through a junction point 60 to a point of fixed potential, such as ground. Voltage dividing resistors 62 and 64 are series connected between the junction point 60 and the slide arm of the potentiometer 58. The slid arm of the potentiometer 58 also connects to a variable rate resistor 66 whose slide arm is connected to an electrode of rate capacitor 68. Theo second electrode of the rate capacitor 68 is connected to a junction point 70 between the series connected resistors 62 and 64. The slide arm of the variable rate resistor 66 is also connected to an electrode of a reset capacitor 72 having its opposite electrode connected to the node 48 thereby completing the feedback circuit. The reset capacitor 72 combines with the input capacitor 46 for forming a voltage dividing arrangement wherein the reset action is established in combination with the adjustable reset resistor 40.

Referring now to FIG. 2, the details of the error amplifier circuitry including the differential summing amplifier 24 and the single stage process variable amplifier 44 are shown. The input terminal 12 is connected to the common terminal 74 of a double-pole double-throw switch 76. The normally closed terminal 78 of the switch 76 is shown connected through the input resistor 16 to the input terminal 20 of the differential summing amplifier 24. A normally opened terminal 80 is connected through the input resistor 18 to the input terminal 22 of the differntial summing amplifier. In a similar manner, the input terminal 14 is connected to a second common terminal 74 of the double-pole double-throw switch 76. The normally closed terminal 78 of this switch section is connected through the input resistor 18 to the input terminal 22, while the normally opened terminal 80 is connected through the input resistor 16 to the input terminal 20. The input terminal 20 connects to the base of a PNP transistor 82, while the input terminal 22 connects to the base of a second PNP transistor 84. The transistors 82 and 84 are emitter connected to a constant current source 86 which in turn is connected to a potential energy source 88. In the present invention the potential energy source may be from a commercially known power supply for providing a potential of +24 volts.

The constant current source 86 includes a P-type field-effects transistor 89 having its source eletrode connected through a resistor 90 to the energy source 88. The drain electrode of the transistor 89 is connected to the emitters of transistors 82 and 84. A voltage divider network comprising resistors 91 and 92 is connected between the energy source 88 and a point of fixed potential, such as ground. The gate electrode of the field-effects transistor 89 conneocts to a common junction between resistors 91 and 92. In the constant current source 86, resistor 90 has a relatively high resistance for lowering the upper end of the V–I characteristic curve of the field effects transistor while the voltage dividing network 91, 92 tends to raise the lower end thereof. This arrangement provides a greater predictability of source output from unit to unit.

The collector of transistor 82 is connected to a junction point 93 which in turn is connected to a point of fixed potential, such as ground. The collector of the transistor 84 connects to the base of an NPN transistor 94 and to the anode of a temperature compensating diode 95. The cathode of the temperature compensating diode 95 is connected through an adjustable resistor 96 to the junction 93. The collector of the transistor 94 connects through a biasing resistor 98 to the potential energy source 88, while the emitter thereof connects to the junction 93. The collector of the transistor 94 also connects to the output terminal 28 of he differential summing amplifier 24.

The single stage process variable amplifier 44 includes an NPN transistor 100 whose base is connected to the input terminal 12. The collector of the transistor 100 is connected through a biasing resistor 102 to the potential energy source 88, while the emitter is connected through a second and a third biasing resistor, 104 and 105, to a point of fixed potential, such as ground. A single-pole double-throw switch 106 is provided with its normally closed terminal 108 connected to the collector of the transistor 100 and its normally opened terminal 110 connected to the junction between the resistors 104 and 105. A biasing resistor 111 is provided between the collector of transistor 100 and a point of fixed potential, such as ground. The biasing resistor 111 and the voltage dividing network formed by resistors 104 and 105 act to attenuate the output signal of the single stage process variable amplifier 44 to a value equal to the output of the differential summing amplifier 24 at its output terminal 28. A common terminal 112 of the switch 106 connects to an electrode of the input capacitor 46 for completing the circuit. The switch 106 in combination with the switch 76 may be utilized for placing the electronic process controller into a direct acting configuration, as shown, or a reverse acting configuration as will be explained hereinbelow.

The high gain, high impedance controller amplifier 52 is arranged in an operational amplifier configuration, as described hereinabove. The amplifier includes a modulator 114 serially connected with an AC amplifier 116 which, in turn, is connected with a demodulator 118 through a transformer connection 120. The output of the demodular 118 is connected to the output terminal 54. Both inputs stages of the modulator 114 and the AC amplifier are respectively connected to the point of fixed potential 27. The output stage of the demodulator 118 is connected to a point of fixed potential, such as ground. The load element 56 includes an NPN transistor 122 whose base is connected to the output terminal 54 of the high impedance controller amplifier 52. The emitter of the transistor 122 is connected through a biasing resistor 124 to a point of fixed potential, such as ground. A load 126 is serially connected between an energy source 128, such as the positive terminal of a 24 volt power supply, and the collector of the transistor 122.

Referring to FIG. 4, a typical control loop is shown. The electronic process controller 10 receives a first input signal through its process variable terminal 12 from a process sensor 130. The controller also receives a set point signal through its set point terminal 14 from a set point generator 132. The output of the controller is applied to the load element 56 which regulates a process 134. In the present example, the control element 56 may be a motor driven fuel valve; while the process 134 is a furnace for melting ore. The process sensor 130, such as a thermocouple and amplifying arrangement, senses the temperature within the process 134 and produces an output signal in proportion thereto.

Referring more specifically to FIGS. 1 and 2, the operation of the error amplifier within the electronic processss controller will now be described. Assuming that the set point generator 130 is set at a midrange position, a set point signal, for example of 3 volts, will be applied to the set point terminal 14. If the process variable signal is also 3 volts, the signal applied to the base of the transistor 82 will balance the signal applied to the base of the transistor 84. The point of fixed potential 27 also applies a signal to the base of the transistor 84, in the present embodiment 3 volts. The adjustable resistor 96 is adjusted until the signal applied to the transistor 94 is sufficient to provide a 3 volt potential at the output terminal 28. This adjustment is the equivalent of a zero adjustment. It should be noted that the point of fixed potential 27 could be replaced by a potential other than 3 volts, for example 5 volts, or could be referenced to zero potential. If the point of fixed potential were referenced to a zero potential, the set point signal and process variable signal would have to be adjustable between a negative value and a positive value for providing adequate control about the point of reference. One advantage of the present arrangement is that the process variable and set point signals have the same polarity thus allowing for a wider range of controller applications. For example, the process controller may be utilized in combination with a second process controller to form a cascading arrangement without encountering the difficulties which arise when negative and positive going input signals are utilized. Another advantage of the present arrangement is the elimination of a positive and negative, multi-potential regulated power supply.

Assuming that the process undergoes a change causing the processs variable signal to increase to 4 volts, the transistor 82 will be turned off for causing more of the current flow from the constant current source 86 to the junction 93 through the transistor 84. This increased current flow to the transistor 84 will turn on the transistor 94 for lowering the potential at the output terminal 28. The negative going input signal at the output terminal 28 is fed through the adjustable reset resistor 40 to the second summing junction 42. At the same time, the process variable signal is applied to the base of the transistor 100, turning on the transistor and causing the potential at the output of the single stage process variable amplifier 44 to decrease. If this signal is decreasing rapidly enough, it will pass through the input capacitor 46 to the summing junction 42. The signals from the differential amplifier 24 and the process variable amplifier 44 are combined and applied to the summing junction 42 for unbalancing that junction and applying a signal to the input terminal of the high impedance, operational amplifier 52. As the amplifier 52 is arranged in an inverting operational amplifying configuration, the output signal at the terminal 54 will have an opposite polarity to the signal applied at the input terminal thereof for rebalancing the summing junction 48 through the feedback network. Thus, the negative going signal applied to the second summing junction 42 appears as a positive going signal at the output terminal 54. The positive going signal is applied to the base of the amplifier 122 within the load element 56. This causes the amplifying transistor 122 to become conductive for increasing the current flow through the load 126. Thus, it will be seen that the arrangement of the circuitry within FIG. 2 provides for a process controller having a direct controlling configuration. That is, as the process variable increases the signal applied to the load also increases.

When it is desired to place the process controller in a reverse acting configuration, the double-pole double-throw switch 76 and the single-pole double-throw switch 106 are placed in their normally opened positions, that is, opposite the position shown in FIG. 2. In this configuration, the increasing process variable signal applied to the base of the transistor 100 within the single stage process variable amplifier 44 causes the transistor to become conductive for increasing the signal applied to the first electrode of the input capacitor 46 and therethrough to the second summing junction 42. The increasing signal is also applied to the base of the transistor 84 within the differential summing amplifier 44 for turniing off the transistor and decreasing the amount of current flowing through the leg in which it is located. As the current decreases within the leg containing the transistor 84, the transistor 94 is turned off for increasing the potential at the first summing junctiton 28. This increasing signal is applied through the reset resistor 40 to the second summing junction 42. The effect of the signals from the two amplifiers unbalances the second summing junction 42 for applying a signal to the controller amplifier. As described hereinabove, the operational amplifier 52 reverses the increasing signal applied thereto and applies a negative going signal to the feedback network for unbalancing the junction 42 and turning off the transistor 122. As the transistor 122 turns off, the current being conducted through the load 126 is decreased. In this matter and increasing process variable signal causes a decreasing current to flow through the load 126 for establishing a reverse acting process controller.

The internal operation of the high impedance, operational amplifier 52 will not be described in detail herein. Reference should be made to Pat. No. 3,081,425, by W. F. Newbold, which issued Mar. 12, 1963 and is assigned to the same assignee as the present invention. The circuitry of the operational amplifier 52 including the modulator 114, AC amplifier 116 and the demodulator 118 is fully described within the Newbold patent.

If the electronic process controller is arranged in a direct acting configuration, as shown in FIG. 2, a step increase 136, FIG. 5a, of the process variable signal applied to input terminal 12 will cause a step signal to be passed through the single stage process variable amplifier 44 and the capacitor 46 to the second summing junction 42. This step signal, applied to the second summing junction 42, is amplified and reversed as shown at 138 in FIG. 5b. The same increasing signal 136 is applied to the differential summing amplifier 24 where it is compared with the set point signal before being passed through the reset resistor 40 to the second summing junction 42. This portion of the circuitry accounts for the negative going ramp 140 of the signal shown in FIG. 5b. The operational amplifier 52 is arranged with its input stage connected to the second summing junction 42 and also to the point of fixed potential 27. As is commonly known in the art, an operational amplifier 52 retains the potential of the second summing junction 42 at a value equal to the potential at the point 27. Thus, the negative going signal 138 applied to the second summing junction 42 causes the amplifier output to respond for returning the potential at the summing junction 42 to the same value as that established at the point of fixed potential 27. The output signal applied to the terminal 54 is fed back through the feedback impedance network including the proportional band resistor 58. The setting of the adjustable proportional band potentiometer 58 determines the amplitude of the output signal 142, FIG. 5c, necessary to cancel the initial amplitude of the input signal 138. The rate circuitry including the voltage dividing resistors 62 and 64, the variable rate resistor 66, and the rate capacitor 68, acts to further delay the feedback signal from the output terminal 54 to the second summing junction 42 for causing an initial increase in the output of the amplifier. The signal which passes through the variable rate resistor 66 is partially shunted to ground through the rate capacitor 68 and the voltage dividing network formed by resistors 62 and 64. The amount of the signal which is shunted to ground is determined by the proportional value of the resistors 62 and 64 for establishing the rate amplitude 144. The rate amplitude 144, illustrated in FIG. 5c, is a proportionally larger signal than the proportional bandsignal 142, and is determined by the ratio of the resistor 62 over the sum of the resistors 62 and 64. After the initial step signal passes through the capacitor 68, that capacitor begins to charge for allowing more of the feedback signal to reach the summing junction 42 and, thus, causing the output signal of the amplifier 52 to slowly decrease or decay as shown at 146. The rate of decay of the amplifier output signal is determined by the RC circuit formed by resistor 66 and capacitor 68. As the step signal 136 passed through the input capacitor 46, a charge was placed thereon. In a similar manner the capacitor 72 is oppositely charged to balance the charge upon the capacitor 46. In the absence of the differential summing amplifier 24, the output of the amplifier 52 would hold at a level somewhere in the vicinity of the lower portion of the decay curve 146 due to a balanced charge condition on the capacitors 46 and 72. However, a continued unbalance between the process variable signal and the set point signal is fed through the differential summing amplifier 24 and the rate resistor 40 for slowly unbalancing the second summing junction 42 which, obviously, is at the same potential as node 48. The amplifier 52 thus produces as output signal for slowly rebalancing the second summing junction 42 to its fixed reference potential. This output forms a reset signal 148, FIG. 5c, for completing the output signal of the controller amplifier 52. The output signal of the controller amplifier is also applied to the load element 56 for controlling the process.

If the set point signal is now adjusted by manual or other means a step change is produced as illustrated in FIG. 5a at 150. This signal is applied through the differential summing amplifier 24 and the adjustable reset resistor 40 to the second summing junction 42. However, the signal is not applied to the single stage process variable amplifier 44. Under these conditions, the second summing junction is slowly unbalanced by the differential summing amplifier, as shown at 151 FIG. 5b. Since there is no signal applied through the amplifier 44, the output of the operational amplifier 52 is slowly decreased as illustrated by the curve 152 in FIG. 5c.

Referring for a moment to FIG. 3, a single-pole double-throw switch 154 is provided between the single stage process variable amplifier 44 and the input capacitor 46. The common terminal 156 of the switch 154 is connected to one electrode of the input capacitor 46, while the normally closed terminal 158 connects to the output of the single stage process variable amplifier 44. A normally opened terminal 160 of the switch 154 is connected by a jumper to the output terminal 28 of the differential summing amplifier 24. In the switch configuration shown, the operation of the circuit is the same as the operation of the circuits shown in FIGS. 1 and 2. However, when the switch 154 is placed in its normally opened position, it functions to eliminate the single stage process variable amplifier 44 from the circuitry. The result of this change over is to apply a characterized output signal to the load element 56 when the set point is manually manipulated just as a characterized output signal is applied to the load element when the process variable undergoes a step change. This arrangement is illustated graphically in FIG. 5d wherein a step change in the process variable signal 136 or a step change in the set point signal 150 produces identical, but opposite characterized output signals 162 from the amplifier 52. In some process controller applications, it is desirable to provide a characterized output signal when either the process variable or set point signal undergoes a step change. The embodiment of the switch 154 within the present invention allows the process controller to be suitably arranged for providing an optional characterization of the output signal when the set point signal undergoes a step change. As described hereinabove, the output of the electronic process controller may be placed in a reverse acting configuration by placing the switches 76 and 106 in their normally opened positions. This configuration is illustrated in FIG. 5e wherein the output signals 152 and 162 are identical to the curves of FIG. 5c with the exception that they are opposite going. If the switch 154 is placed in its normally opened position, manual adjustment of the set point which generates a step change signal 150 would cause the output signal of the controller to follow the curve illustrated by the dashed line 163, of FIG. 5e.

Referring now to FIG. 3, a further embodiment of the present invention is shown wherein the electronic process controller 10 is provided with a reset limiting circuit 164 and an output limiting circuit 166. The reset limiting circuit 164 includes a PNP transistor 168 and an NPN transistor 170 having emitters commonly connected to the output terminal 54 of the high impedance controller amplifier 52. The base of the transistor 168 is connected to the slide arm of an adjustable potentiometer 172 while the base of the transistor 170 is connected to the slide arm of a second adjustable potentiometer 174. The slide wires of the adjustable potentiometers 172 and 174 serially connected between a point of fixed potential, such as ground, and via a biasing resistor 176 to a potential energy source 178. The collectors of the transistors 168 and 170 are commonly connected to a junction point 180. A resistor connects the junction point 180 to the first summing junction 34. The output limiting circuit 166 includes a pair of back biased diodes connected to the junction 180 wherein the first diode 184 is arranged with its anode connected to the junction 180, and the second diode 186 is arranged with its cathode connected thereto. The cathode of diode 184 is commonly connected with the anode of diode 186 to the point of fixed potential 27 to which the input stage of the controller amplifier 52 is also connected.

Referring now to FIG. 6a, the operation of the reset limiting and output limiting circuitry will be described. Continuing the example of a furnace for melting ore into molten metal, when the furnace is initially started, a considerable amount of time will elapse before the material therein is brought up to the desired temperature. In the electronic process controller 10, the desired temperature will be indicated when the process variables signal equals the set point signal. Assume for this illustration, that the switch 154, FIG. 3, is in its normally closed position and the switches 76 and 106, FIG. 2, are in their normally opened position. When the cold furnace is turned on, the process variable signal applied to the electronic process controller will be at its minimum value, in the present illustration 1 volt. The process controller will react as if the set point had been increased by a step function as shown at 150 in FIG. 5a, while the output thereof will react as shown at 152 in FIG. 5e. Thus, as shown in FIG. 6, the process variable signal will follow the curve 188 for asymptotically approaching the set point shown by line 190.

In prior art process controllers, a large disproportional difference between the set point signal and process variable signal will cause the operational amplifier 52 to become saturated. That is, a large input signal applied to the controller amplifier will drive the amplifier out of its linear operating range. A prior art process controller, after becoming saturated due to a disproportional relationship between process variable and set point signals, will accumulate a large capacitive charge upon the reset capacitor 72. The reason for the accumulation of the unwanted capacitive charge is that an operational amplifier once saturated will no longer retain the summing junction associated therewith at the reference potential which is connected to the input stage thereof. Under these conditions, as the process variable signal approaches the set point, it must pass the set point before the amplifier is able to come out of saturation and dissipate the charge on the reset capacitor 72. This is due to the fact that the charge on the capacitor 72 must be dissipated by an output signal from the amplifier which is opposite to the signal which charged the capacitor 72. Thus, the process variable substantially overshoots the set point for creating what is termed in the art "reset windup." Further, the resultant overshoot causes the process variable to become enough larger than the set point for again saturating the controller amplifier 52 and accumulating an unwanted charge on the reset capacitor 72. This action has a tendency to cause the process variable signal to overshoot the set point for a second time as shown by the dashed curve 194. The utilization of the reset limiting circuit provides a means for insuring that the process variable signal follows the curve 188. This is achieved by comparing the output of the amplifier at the terminal 54 with the input of the amplifier at the first summing junction 34, between the resistor 32 and reset resistor 40. When the difference between these points exceeds a predetermined value, determined by the bias setting of the transistors 168 and 170, one of these transistors will become conductive for shunting a portion of the output signal from the amplifier 52 back to the summing junction 34 for partially canceling the incoming error signal applied thereto. In the example described hereinabove, the process variable signal will appear as a negative going signal; and the output signal from the error amplifier will also appear as a negative going signal at the first summing junction 34. The output of the controller amplifier 52 appears as a positive going signal at the output terminal 54 for causing, when this output exceeds the predetermined value, the transistor 168 to become conductive and shunt the output signal back to the first summing junction 34 for decreasing the incoming error signal.

The circuit thus described is substantially similar to that descrbed in a patent application by James A. Hogan, Ser. No. 405,654, filed Oct. 22, 1964, now Pat. No. 3,413,561, which is assigned to the same assignee as the present invention. The circuit disclosed by the present invention utilizes a pair of biased transistors which provide sharper switching and a more economical arrangement. Further, the arrangement of the present invention allows for the utilization of a single voltage power supply which, in the present illustration utilizes, all positive voltages.

Once the reset limiting circuit 164 becomes conductive, the output limiting circuit 166 is brought into use. One of the functions of the output limiting circuit is to prevent transients which occur at the process variable or set point terminals, 12 and 14 respectively, from producing unwanted effects at the output of the amplifier 52 and, thus, affect the load element 56. The curve 196, FIG. 6b, is a typical illustration of the effect a transient signal would have on the output of an electronic process controller in the absence of either the reset limiting or output limiting circuits, 164 or 166. Many prior art limiting circuits have been suggested. A more commonly used circuit includes a pair of back biased diodes arranged for shunting an input signal applied to the controller amplifier across the input terminals thereof when that signal exceeds a predetermined value. This prior art circuit does not prevent the controller amplifier from saturating but insures the output of the controller will follow the curve 188 during start up. However, as transient appears across the input terminals, the output of the amplifier produces a large momentary spike and dumps the reset signal stored within the reset circuitry for causing the output of the controller to follow a curve similar to that indicated at 198. The dumped reset signal 199 is caused by the reset circuitry of prior art controller which produces a shunt within the circuitry for shorting the reset capacitor and allowing the stored signal therein to be discharged. A second prior art controller utilizes a pair of back biased diodes connected between the output terminal 54 of the controller amplifier 52 and the second summing junction 42 thereof. This circuitry arrangement prevents the amplifier from saturating and insures that the output signal thereof follows the curve 188 during start up. Further, this circuit provides for output limiting. That is, the transient 196, which normally appears at the output of the process control amplifier when a transient is applied to the input, is limited by the prior art circuitry. However, as indicated by the curve 200, this circuitry also dumps the reset signal 199 stored within the reset circuitry when a transient occurs.

The present invention seeks to eliminate the difficulties discussed herein by the combination of the reset limiting circuit and the output limiting circuit, 164 and 166. When a transient appears across the input terminals of the circuit illustrated by the present invention, the reset limiting circuit becomes conductive which applies this transient to the ouput limiting circuit and the resistor 182. If the signal is sufficiently large, the appropriate diode 184 or 186 will become conductive for shunting the transient caused output signal from the amplifier to the point of fixed potential 27. The diodes 184 and 186 are chosen to have a pedestal voltage of approximately .3 volt. When either diode is conducting, it creates a small feedback voltage which is applied across the reset resistor 40 during that time for preventing the output of the amplifier and, in turn, the reset capacitor 72 from being shorted completely to the value of the fixed potential 27. This arrangement prevents the reset capacitor 72 from being discharged and thereby prevents the dumping of the reset signals stored thereon. The output of the electronic process controller of the present invention is thus shown by the curve 202. Just as the potential applied across the reset resisor 40 during the output limiting phase prevents reset dump, the application of the reset limiing signal across the resistor 40 also prevents the dumping of the reset signal during the time that the reset limiting circuit is activated. It should be noted that the reset limiting and ouput limiting circuits described herein prevent the bias or charge upon the capacitor 72 from increasing beyond a predetermined amount and, at the same time, prevent the bias thereon from being dumped during the activation of either of the circuits. Further, these circuits 164 and 166 prevent reset windup by allowing the process controller to come up to its set point signal without overshooting, and these circuits prevent the controller amplifier 52 from becoming saturated by limiting the error signal caused by the difference between the process variable and set point signals.

The circuitry thus described by the present invention provides an improved electronic process controller which functions from a uni-voltage power supply, is capable of reverse or direct action, prevents unwanted fluctuation of the load element during manual or computer manipulation of the set point, prevents reset windup, limits the output, and prevents the dumping of a reset signal by a transient condition.

The embodiments of the invention in which an exclusive property or privilege is claimed are defined as follows:

1. A process controller for varying a load element in response to input signals including first and second input signals, comprising:
   controller amplifying means having an input stage and an output stage with the output stage thereof connected to said load element;
   differential amplifying means for receiving both said first and second input signals;
   first signal amplifying means for receiving only said first input signal;
   first impedance means connecting said first signal amplifying means to the input stage of said controller amplifying means for passing said first input signal to said controller amplifying means when said first input signal undergoes a rapid change;
   second impedance means connecting said differential amplifying means to the input stage of said controller amplifying means for gradually passing the difference between said first and second input signals to said controller amplifying means when either of said first or second input signals undergoes a change;
   a point of fixed potential;
   means connecting said differential amplifying means and the input stage of said controller amplifying means to said point of fixed potential; whereby said first and second input signals may have potentials of the same polarity and may vary about said point of fixed potential.

2. A process controller for varying a load element in response to input signals comprising:
   first and second input terminal means for respectively receiving said input signals including a process variable signal and a set point signal;
   differential summing amplifying means having an input and output stage with said input stage connected to said first and second input terminal means for receiving said process variable and said set point signals;
   first signal amplifying means having an input and an output stage;
   means connecting said first input terminal to said input stage of said first signal amplifying means for receiving said process variable signal;
   a summing junction;
   first impedance means connected between the output stage of said first signal amplifying means and said summing junction;
   said first impedance means effective to pass only relatively rapid variations in said process variable signal to said summing junction;
   second impedance means connected between the output stage of said differential summing amplifier means and said summing junction;
   said second impedance means effective to pass relatively gradual variations in the difference between said process variable signal and said set point signal to said summing junction;
   controller amplifying means having an input and output stage, said input stage of said controller amplifying means connected to said summing junction;
   feedback impedance means; and
   said output stage of said controller amplifying means connected to said load element and connected by said feedback impedance means to said summing junction to maintain said summing junction in a balanced condition; whereby a rapid variation of said process variable signal is passed through said first signal amplifying means connected to said first impedance means and through said differential summing amplifying means connected to said second impedance means to said summing junction for rapidly and then gradually unbalancing said junction and producing an output signal from said controller amplifying means to vary said load element and to rebalance said summing junction through said feedback impedance means, and a rapid variation of said set point signal is passed through said differential amplifying means connected to said second impedance means to said summing junction for gradually unbalancing said junction and producing an output signal from said controller amplifying means to vary said load element and to rebalance said summing junction through said feedback impedance means.

3. A process controller for varying a load element in response to input signals including first and second input signals as claimed in claim 1, additionally comprising:
   feedback impedance means connected between the output stage and the input stage of said controller amplifying means for forming an operational amplifying configuration;
   a current summing junction formed at the input stage of said controller amplifying means by the junction of said feedback means, first impedance means, and second impedance means;
   limiting means connected from the output stage of said controller amplifying means to a point between said differential amplifying means and said second impedance means including, transistor switching means, and means for biasing said transistor switching means;
   said limiting means arranged for conducting a predetermined portion of an output signal from said controller amplifying means to the input thereof when said output signal exceeds an adjustable limit for reducing the signal formed by said differential amplifying means as said first and second input signals undergo a change and thereby preventing the saturation of said controller amplifying means.

4. A process controller for varying a load element in response to input signals including first and second input signals as claimed in claim 3, additionally comprising:
   second limiting means connected between said first mentioned limiting means and said point of fixed potential,
   said second limiting means including biasing means for shunting the output signal of said controller amplifying means to said point of fixed potential after said output signal has exceeded its adjustable limit and caused said first mentioned limiting means to become conductive, thereby preventing the output signal of said controller amplifying means from exceeding a predetermined limit.

5. A process controller for varying a load element in response to input signals including first and second input signals as claimed in claim 1, additionally comprising:
   first and second input signal terminals for receiving said first and second input signals;
   said differential amplifying means having first and second amplifier input terminals;
   said first signal amplifying means including first and second output terminals;
   switching means joining in a first position said first input signal terminal to said first amplifier input terminal and said second input signal terminal to said second amplifier input terminal, while joining in a second position said first input signal terminal to said second amplifier input terminal and said second input signal terminal to said first amplifier input terminal; and second switching means for connecting said first output terminal of said first signal amplifying means to said first impedance means when said first mentioned switching means is in said first position, and instead connecting said second output terminal to said first impedance means when said first mentioned switching means is in said second position; whereby the output signal of said controller amplifying means is direct acting in said first position of said switching means and reverse acting in said second position of said switching means.

6. A process controller for varying a load element in response to input signals including first and second input signals as claimed in claim 5, additionally comprising:

said first signal amplifying means includes a transistor amplifier having said first output terminal connected to the collector and said second output terminal connected to the emitter thereof;

said first signal amplifying means being arranged for providing a decreasing output signal where said second switching means is connected to said first output terminal and said first input signal is increasing, and arranged for providing an increasing output signal when said second switching means is connected to said second input terminal and said first input signal is increasing.

7. A process controller for varying a load element in response to input signals including first and second input signals as claimed in claim 5, additionally comprising:

said differential amplifying means includes first and second emitter connected transistor amplifiers having the base of said first transistor amplifier connected to said first amplifier input terminal and the base of said second transistor amplifier connected to said second amplifier input terminal;

a constant current source connected to said emitter connection;

a third transistor amplifier connected to the collector of said second transistor amplifier having the collector thereof connected to said second impedance means;

said differential amplifying means arranged for providing a decreasing output signal when said first mentioned switching means is arranged in said first position and said first input signal is increasing, and arranged for providing an increasing output signal when said first mentioned switching means is arranged in said second position and said first input signal is increasing.

8. A process controller for varying a load element in response to input signals including first and second input signals as claimed in claim 2, additionally comprising:

switching means for connecting in a first position said output stage of said first signal amplifying means to said first impedance means, and instead connecting in a second position said output stage of said differential summing amplifying means to said first impedance means;

said switching means arranged in said second position for passing a rapid variation of said process variable signal or said set point signal through said first impedance means for rapidly unbalancing said summing junction whenever said process variable signal or set point signal undergoes a rapid variation.

References Cited
UNITED STATES PATENTS

| | | | |
|---|---|---|---|
| 2,438,217 | 3/1948 | Johnson | 330—151 X |
| 2,760,011 | 8/1956 | Berry | 330—151 X |
| 3,119,970 | 1/1964 | Thompson et al. | 330—123 |

NATHAN KAUFMAN, Primary Examiner

U.S. Cl. X.R.

330—1, 30, 38, 69